United States Patent [19]

Kaltz et al.

[11] 4,185,868
[45] Jan. 29, 1980

[54] ELECTRICALLY OPERATED HATCH ROOFS

[75] Inventors: Milton C. Kaltz, Allen Park; Heinz C. Prechter, Grosse Ile, both of Mich.

[73] Assignee: American Sunroof Corporation, Southgate, Mich.

[21] Appl. No.: 826,370

[22] Filed: Aug. 22, 1977

[51] Int. Cl.² .............................................. B60J 7/10
[52] U.S. Cl. ............................................. 296/137 B
[58] Field of Search .......... 296/137 B, 137 C, 137 D, 296/137 E, 137 F, 137 G; 49/360, 280

[56] References Cited

U.S. PATENT DOCUMENTS

| | | | |
|---|---|---|---|
| 2,985,483 | 5/1961 | Bishop et al. | 296/137 G X |
| 3,036,850 | 5/1962 | Geiger | 49/36 X |
| 3,610,682 | 10/1971 | Vermeulen | 296/137 E |
| 3,964,784 | 6/1976 | Prechter et al. | 296/137 E |
| 3,993,348 | 11/1976 | Pizzuti | 296/137 E |
| 4,081,926 | 4/1978 | Jardin | 49/360 X |

FOREIGN PATENT DOCUMENTS 566642  2/1957  Italy .............................................. 49/36

*Primary Examiner*—Joseph F. Peters, Jr.
*Assistant Examiner*—Norman L. Stack, Jr.
*Attorney, Agent, or Firm*—Basile and Weintraub

[57] ABSTRACT

An electrically operated "hatch" roof assembly for mounting in automobiles includes a pair of opposed "hatch" glass panels. The panels move between a closed position, which is flush with the roof of the vehicle and an open or retracted position, wherein the panels nest beneath one another centrally of the roof. A roof support section has a pair of opposed tracks in which are slidably mounted the panels. The panels, when inboard, nest beneath the support section. Electrically powered lifter mechanisms transport the hatch roof panels between the inboard and outboard positions.

9 Claims, 7 Drawing Figures

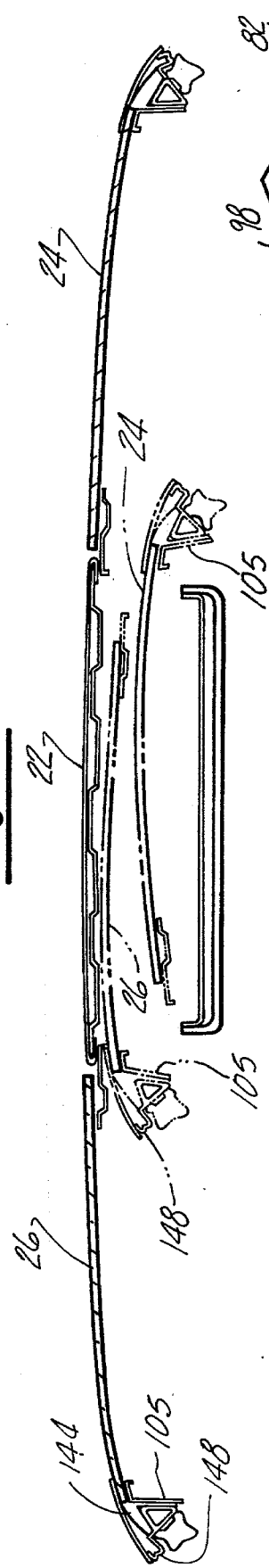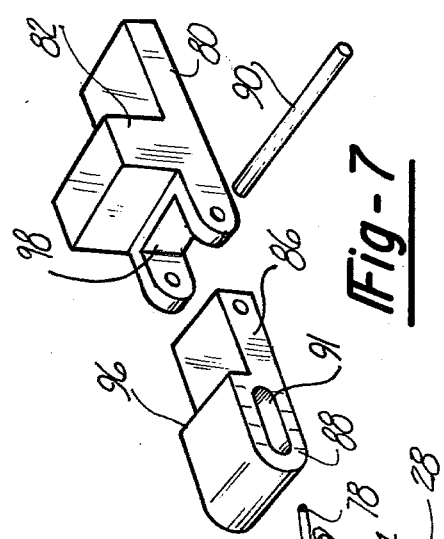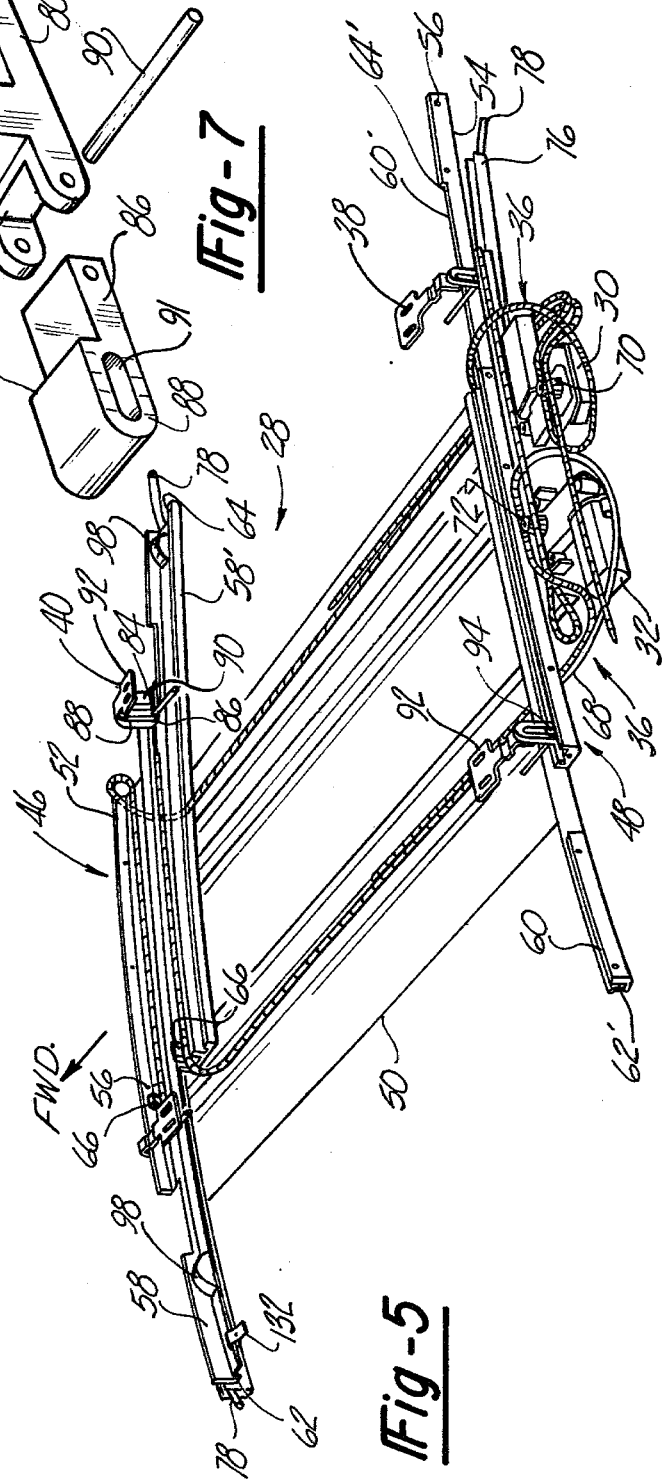

ELECTRICALLY OPERATED HATCH ROOFS

BACKGROUND OF THE INVENTION

1. Field of the Invention

The present invention pertains to automotive vehicles and equipment therefor. More particularly, the present invention pertains to roof assemblies for automotive vehicles. Even more particularly, the present invention pertains to hatch-type roof panels for automotive vehicles.

2. Prior Art

Due to Federal safety regulations the "convertible" type automobile has disappeared from the market. To compensate for this segment of the market as well as to provide an effect to the driver similar to that of the convertible many alternatives have been proposed.

Initially, many small sport cars were provided with "pop-off" roofs. This, however, is not feasible for installation in full size automobiles. In the early 1960's there was commercially developed for such full size cars a concept commonly referred to as a sunroof. A sunroof, as is known to the skilled artisan, nominally comprises a metallic panel mounted in the roof of a vehicle which is either manually or mechanically driven or moved between an open and a closed position. The panel which is slidably mounted from front or rear in the vehicle stores in a compartment formed by an interiorly mounted sub-roof and the roof of the vehicle when in an open mode. The open mode provides an opening in the roof to permit exposure for the vehicle passengers to the environment. The closed mode closes and seals off the opening. Again, as is known to the skilled artisan the sunroof has met with great success.

Subsequent to the sunroof development a further innovation introduced to the market was the "moonroof." The moonroof replaced the sunroof metallic panel with a translucent glass or synthetic resinous panel. The moonroof, because of its translucent panel permitting viewing of the environment, has enjoyed phenomenal success. In order to accommodate different segments of the market many types of moonroofs are available. For example, the detachably mounted moonroof, the manually slidable moonroof as well as the mechanically driven moonroof are all commonplace.

Today, there is an even further advance in the market, i.e. the "hatch roof." The hatch roof, as is presently known, comprises a pair of analogous translucent roof panels having their inboard ends affixed to a T-bar section of the roof and their outboard ends attached to the sides of the roof of the vehicle such that the outboard ends are contiguous with the roof structure. Such hatch roofs are manually operated and detachably mounted on the roof. Because of sealing and storage problems heretofore encountered hatch roofs have always been available only in a manually operable state. The present invention on the other hand, and as will subsequently be detailed, provides a mechanically operated hatch roof system.

PRIOR ART STATEMENT

To applicants' knowledge the most relevant prior art known is the following:

U.S. Pat. No. 3,036,860
U.S. Pat. No. 3,136,576
U.S. Pat. No. 3,635,519
U.S. Pat. No. 2,556,062
U.S. Pat. No. 2,815,977
U.S. Pat. No. 2,020,346
U.S. Pat. No. 2,022,718
U.S. Pat. No. 3,348,877
U.S. Pat. No. 1,844,548
U.S. Pat. No. 2,001,136
U.S. Pat. No. 1,603,181
U.S. Pat. No. 1,603,182

SUMMARY OF THE INVENTION

In accordance with the present invention there is provided a powered hatch roof assembly comprising a pair of opposed sliding glass roof panels which move between a closed position and open position. In closed position the panels are nested one below the other beneath a T-bar disposed centrally of the vehicle and longitudinally extending from front to rear.

The panels are each disposed or slidingly mounted in a frame which includes a track for guiding movement of the associated panel.

An electric motor associated with each panel has its output connected to a gear assembly which operates a drive cable system to move the associated panel between the open and the closed position.

Lifter assemblies facilitate the necessary motions to lower and lift the inboard portions of the panels for opening and closing the panels.

For a more complete understanding of the present invention reference is made to the following detailed description and accompanying drawing. In the drawing like reference characters refer to like parts throughout the several views in which:

BRIEF DESCRIPTION OF THE DRAWING

FIG. 4 is a cross-sectional view taken along line 4—4 of FIG. 1 and depicting, in phantom, the nesting mode of the vehicle.

FIG. 5 is a perspective view of the track and cable T-bar assembly utilized in the practice of the present invention, FIG. 7 is an expanded, perspective view of a lifter assembly utilized in the practice of the present invention.

DESCRIPTION OF THE PREFERRED EMBODIMENT

Figure 1:
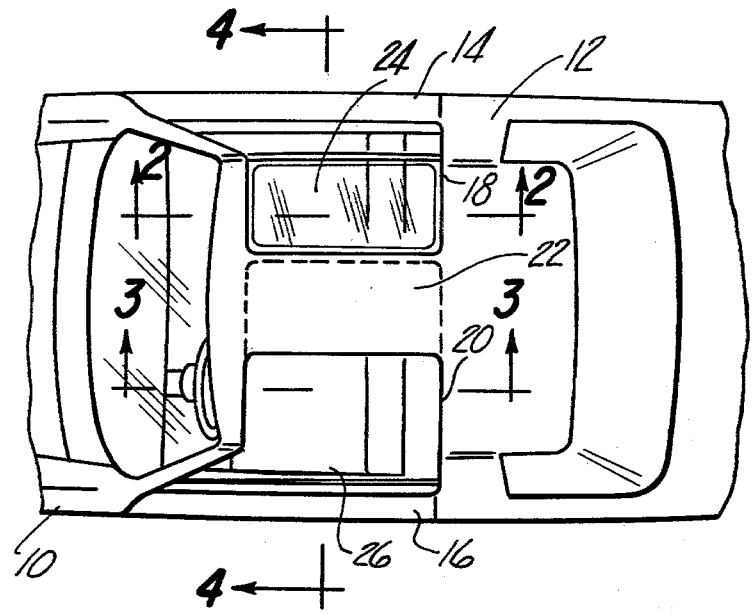
FIG. 1 is a top plan view of a vehicle having a pair of hatch roof panels in accordance with the present invention.

Now, and with reference to the drawing, there is depicted a vehicle 10 having a roof or roof section 12, and a pair of opposed doors 14, 16. A pair of openings 18, 20 are formed in the roof section 12. The openings 18, 20 extend transversely from the center of the roof toward the doors, as shown. As shown in FIG. 1, between the two openings is a frame or support section 22 which is integral with the roof.

Associated with each opening 18, 20, is a glass roof panel assembly 24, 26, respectively. Each panel assembly 24 or 26 is mounted for sliding movement, within the associated opening, between an open or retracted position and a closed or extended position. In the closed position the panel assemblies are contiguous with the roof and the associated door of the vehicle. In the retracted or open position the panels nest beneath the support 22 in overlying relationship (FIG. 4).

It should be noted with respect hereto that the present invention is referenced within the context of a glass panel or other translucent member. However, the present invention is equally applicable to opaque panels and such are within the scope of the present invention. However, for facilitating an understanding hereof the description is made with reference to a glass panel.

In accordance with the present invention, the glass panels are mounted for sliding movement in a frame 28. Each panel 24 or 26 is powered by means 30 or 32 for sliding movement in the frame 28. Drive cable means 34, 36 associated with each means 30, 32, respectively, translate the associated panels within the frame 28. Lifter assemblies 38, 40, 42 and 44 support the inboard portions of the panels and are rendered moveable by the drive assemblies in a manner to be described subsequently.

With more particularity, the support frame 28 is mounted interiorly of the vehicle 10. The frame comprises a pair of opposed peripheral channel forming sections 46, 48 and an interconnecting support panel 50. The panel 50 is dimensioned to that of the pillar or support 22 and is adapted to be coincident therewith.

The sections 46, 48 comprise upstanding walls 52, 54 which are integral with the panel 50. The upper edge of each wall has a plurality of apertures 56 formed therealong. Insertable through the apertures are fastening means (not shown) which securely mount the sidewalls and, thus, the frame to the peripheral walls of the openings 18, 20.

Each wall section 46, 48 includes a pair of spaced apart, displaced tracks 58, 58' and 60, 60'. The tracks 58, 60 define a guide rail for roof panel assembly 26 and the tracks 58', 60' define a guide for roof panel assembly 24. It should be noted with respect hereto that the guide rails defined by the tracks must be both vertically and laterally offset with respect to one another in order to enable the nesting mode of the panels beneath the pillar 22. Thus, for purposes of facilitating an understanding hereof the guide defined by tracks 58, 60 is referred to as the upper guide and the guide defined by tracks 58', 60' is referred to as the lower guide. Because of the nesting relationship the upper guide overlies a substantial portion of the lower guide, as shown.

Each guide rail is defined by a pair of slotted, opposite channels 62, 62' and 64, 64', respectively. Mounted for sliding movement within the channels 62, 62' are lifter assemblies 42, 44, respectively. Mounted for sliding movement in channels 64, 64' are lifter assemblies 40, 38, respectively.

Disposed in each channel, proximate the inboard end thereof is an upstanding bracket 66 (only one of which is shown). The brackets 66, each have one side edge thereof engageable with the lifter assembly associated thereof. The engagement between the side edge of the bracket and the assembly serves to limit the inboard translation of the lifter assembly. Thus, the edge of the bracket acts as a stop to limit the inboard movement of the associated lifter assembly. The bracket 66, also, defines a cable support for the cable associated with the lifter assembly thereof.

The rearward end of the frame 28 has a platform 68 integrally formed therewith (FIG. 5). Mounted on the platform are the motors 30, 32. The reversible motors 30, 32, respectively, power the movement of the associated panel 24, 26, respectively. The output of each motor is connected to a gear assembly, including a bevel gear 70, 72, respectively. The cables, 34, 36 associated with each panel are driven by the related bevel gear. The motors are each, independently, connected to a suitable switching mechanism (not shown) which is, in turn, interposed between the battery of the vehicle (not shown) and the related motor. In this manner the electrically operated motors are independently operable between open and retracted positions. Thus, the panels are moveable independent of one another. Also, an arcuate ledge 74, 76 is formed beneath the sidewalls 46, 48. The corners of each ledge are in communication with drain tubes 78 for eliminating condensates therefrom.

The cables 34, 36, per se, have a helically wound structure formed on their outer surfaces. The wound structure engages the bevel gear associated therewith. Thus, as the gear rotates the engagement of the wound structure therewith causes translation of the cable. The cable is housed within a hollow, rigid conduit (not shown) to protect the cable from the environment. Furthermore, the conduit supports the cable, prevents it from flopping around, while controlling the path of travel of the cable. The conduit is formed from any suitable material, such as, aluminum, which is bent and contoured to store the necessary lengths of cable within the area defined by the frame as well as, as noted, to define and control the travel path of the cable.

It should be noted that each motor is used to power two cables, one cable per lifter assembly.

The free or opposite end of the cable travels through the associated bracket and is securely affixed to the associated lifter assembly.

Referring, now, to FIGS. 2, 3, 5 and 6 there is depicted therein the lifter assemblies 38, 40, 42, and 44. Since each lifter assembly is constructed similarly, the ensuing discussion with reference to one lifter assembly is equally applicable to all lifter assemblies.

The lifter assembly, which defines a slidable support for the inboard ends of the glass panel assembly, comprises a slidable plate 80 disposed in the associated track thereof. The plate has an upstanding pin support portion 82 integrally formed therewith. The plate and support define a generally triangulated member which is cast from any suitable material, such as brass or the like. Projecting laterally inwardly toward the opposite sidewall is a pin 84. The pin has one end thereof affixed to the support 82. The pin 84 engages the edge of the bracket 66 to limit the inboard movement of the lifter assembly. The outboard side of the slide plate 80 has a recess 86 formed therein. The flanges ringing the recess formed in the plate 80 have registering apertures formed therethrough. The flanges are occasioned by the formation of the recess. Mounted within the recess 86 is a link or toggle 88. The base of the link 88 has an aperture formed therethrough. A pin 90 extends through the aperture formed in the flanges as well as the base of the link to render the link pivotally mounted to the slide plate. The link has a longitudinal slot 91 formed therealong. A plate 92 is secured to the link via fastening means 94. The plate 92 is utilized to interconnect the link to the associated glass panel in a manner to be described subsequently.

As shown in FIG. 7 the link 88 has a shoulder portion 96 formed therewith. The shoulder portion engages a boss 98 formed on the plate 80 to thereby limit the rotation of the link about the pivot pin 90. Because the plate 80 is disposed within a channel the link is pivotable between a horizontal and upright position. It should be noted in this regard that a camming surface 97 is disposed in each channel. The camming surface engages the link, during its travel, to effectuate a vertical alignment of the link, again, in a manner to be described subsequently. The camming surface is disposed substantially medially of the channel associated therewith.

As heretofore noted, the link 86 receives a fastening means 94 in the slot 90 thereof to secure the plate 92 thereto. The link, preferably, has a serrated exterior surface for effecting a positive locking with the fastening means. Preferably, the fastening means comprises a threaded fastener and nut assembly. Because the plate 92 is secured to the associated panel assembly, it is to be appreciated that the slot affords vertical adjustment of the panel by altering the position of the fastening means within the slot.

Figure 6:
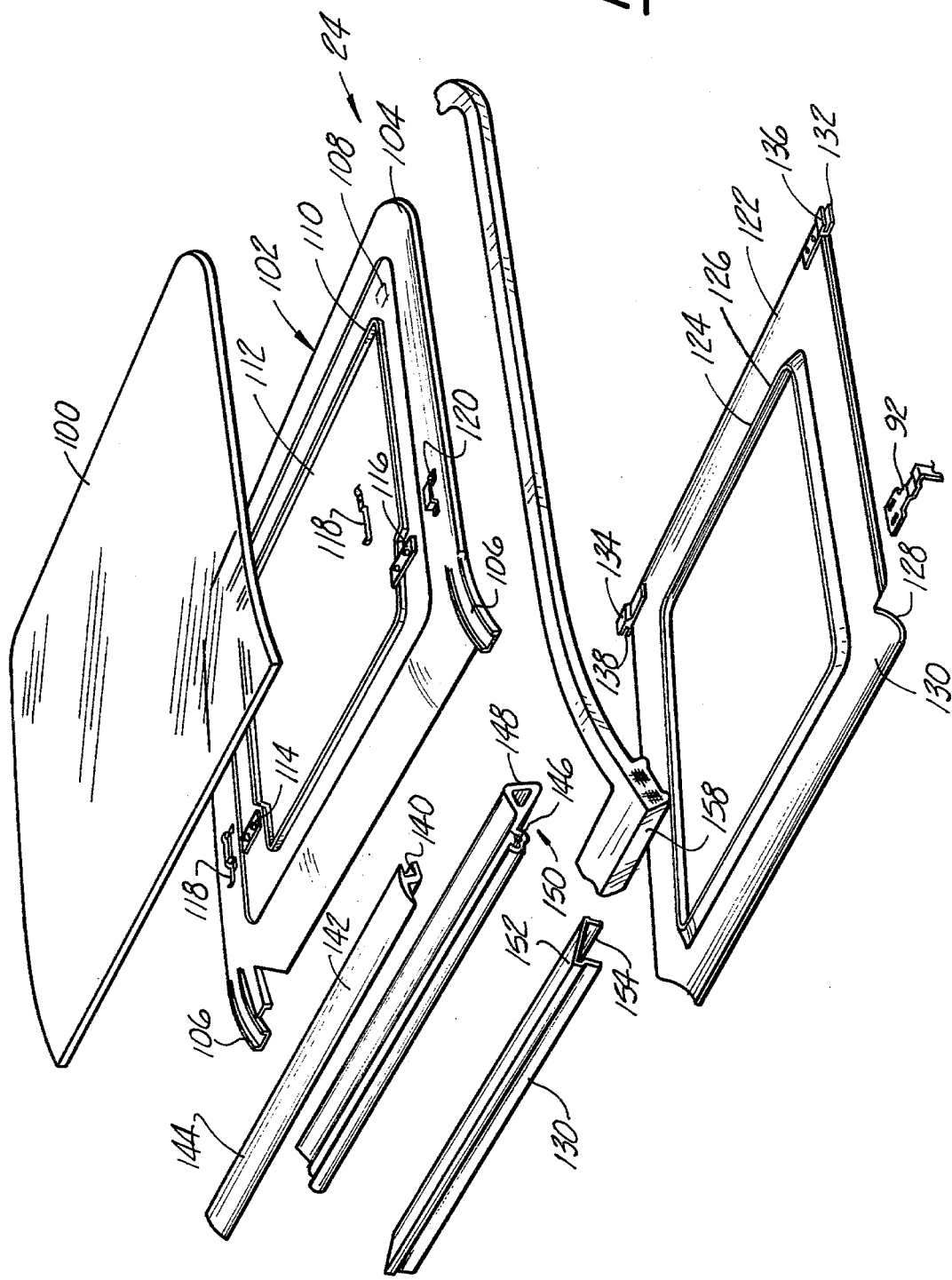
FIG. 6 is an exploded, perspective view of a hatch roof panel utilized in the practice of the present invention.

Referring, now, to FIG. 6, there is depicted therein a glass panel assembly 24 or 26 in accordance with the present invention. Since these hatch roof glass panel assemblies are mirror images of each other only one will be described. However, the description is equally applicable to both.

The assembly comprises a translucent panel 100 which is, preferably, glass. As noted hereinabove, the panel can be an opaque body or other translucent member. The panel 100 has a contour the same as that of the roof of the vehicle in order to ensure contiguity. The panel 100 seats atop a support 102. The support 102 includes a peripherial rim 104 with outboard drain spouts 106 formed therewith. The spouts 106 communicate with the ledges 74, 76 to drain condensate. Interiorly of the rim 104 is formed a depression 108 which extends about the perimeter of the support. An upstanding ridge 110 extends about the periphery of a central opening 112 formed in the support. The glass panel 100 seats on the ridge 102. It should be noted that the outboard edge or rim of the panel interiorly of the drain spouts is contoured to be contiguous with the door of the vehicle.

Adjacent the ridge 110 and within the depression 108 are a pair of opposed apertured plates 114, 116. The plates receive threaded fasteners (not shown) to securely hold down springs 118 in position via retainer 120.

Secured to the undersurface of the support 102 is a trim bezel 122. The trim bezel is configured analogously to the support 102 and includes a central opening 124 and an upstanding inwardly sloped ridge 126 which extends about the perimeter of the opening 124. The apertures 124 and 112 cooperate to define a viewing opening when the glass panel is in a closed position.

As shown in the drawing, the outboard edge 128 of the bezel has a depending portion 130. The portion 130 has the contoured portion of the support 102 as well as hereinafter described moldings and weather strippings nested therewithin.

Secured to the inboard lateral sides of the bezel 122 are track guides 132, 134, each having slots 136, 138, respectively, formed therein. The slots engage the tracks associated with the guide rails, defined by the frame 28 for guiding movement of the panel assembly.

The outboard edge of the panel 100 fits into a channel 140 formed in a trim molding 142. The crown 144 of the molding 142 is, in turn, fitted into channel or slot 146 of rail 148. The channel section 146 of the rail 148 is offset with respect to the remainder thereof to form a recess 150, as shown. Disposed within the recess is a trim mold 152. The trim mold 152 is substantially U-shaped and excludes an outboard facing recess 154. The trim mold 152 is secured to the rail 148 by any suitable mold, such as, by rivets, threaded fasteners or the like.

Bounding the perimeter of the support and the glass panel is a weather stripping 156 having an enlarged outboard side 158 which fits within channel 154. The entire assembly, as noted, nest within section 130 of the bezel 122.

Figure 2:
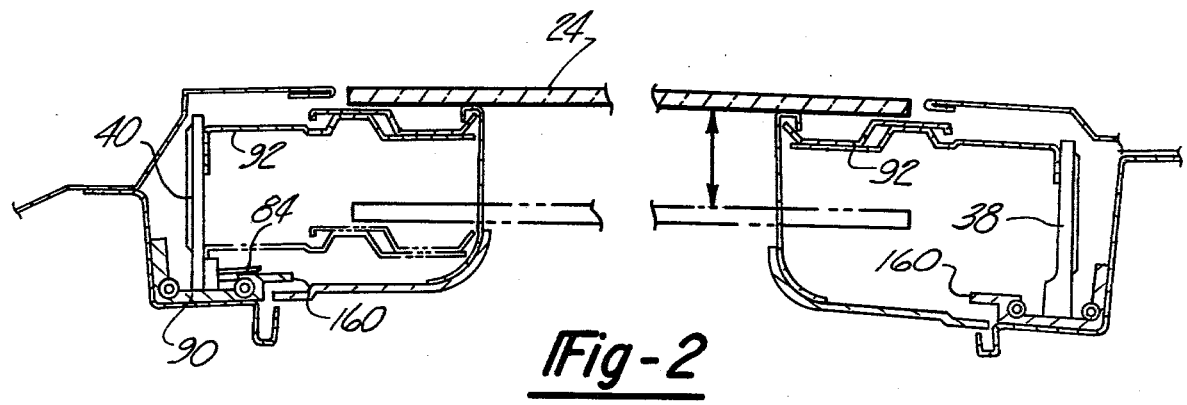
FIG. 2 is a broken, expanded, schematic cross-sectional view taken along line 2—2 of FIG. 1 and showing the glass panel in two positions.
Figure 3:
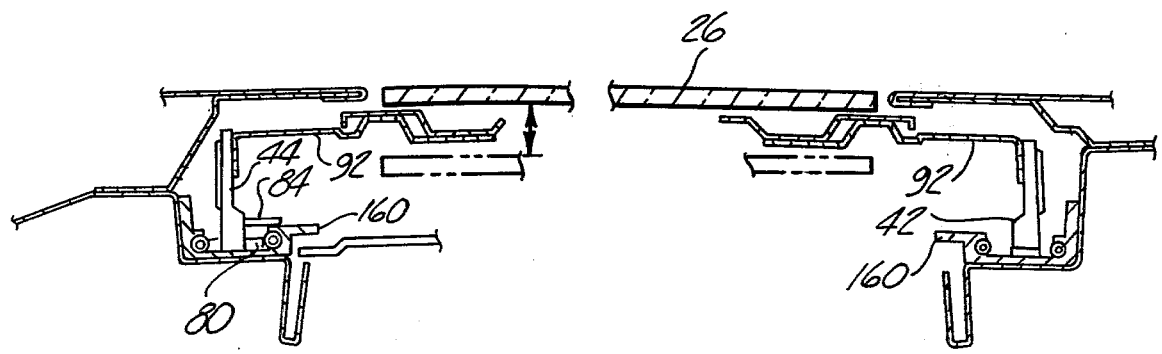
FIG. 3 is a broken, expanded, schematic cross-sectional view taken along line 3—3 of FIG. 1 and showing the glass panel in two positions.

In enabling the movement of the glass panels the plates or brackets 92 are secured to the inboard end of the associated panel assembly by any suitable mode including threaded fasteners or the like. The outboard end of the panels 24 or 26 are supported by track guides 160 (FIGS. 2 and 3). The track guides are constructed analogously to the track guides 132, 134, referred to above.

As shown in FIG. 5 the inner edge of each channel includes a bifurcated track 162 which fits within the slots of the track guides. These guides are more particularly described in the above-referred to U.S. Pat. No. 3,964,784.

Assuming a closed position of the roof panels, the present invention works in the following mode: the lifter mechanisms are in contact with the associated camming surfaces to maintain the link in an upright position. This immediately moves the plate 80 away from the camming surface causing the link to drop to the horizontal plane toward the outboard position, thereby, dropping the inboard edge of the associated glass panel below the existing vehicle roof line. Continued inboard movement of the panels toward the support 22 causes the panels to nest beneath one another under the support section (FIGS. 2, 3 and 4).

To close the panels, the switch or switches are reversed to pull the drive cable. In order to maintain the necessary clearance the toggle remains in the horizontal position as the panel moves outboard. When the cable has been entirely paid out, subsequent movement of the lifter causes engagement of the toggle with the camming surface to urge the link to the vertical. This, in turn, urges the inboard edge of the panel into contiguity with the existing roof line. It is to be understood that the lifters associated with any one panel acts simultaneously.

Furthermore, in order to ensure proper sealing upon closure, it is practicable in the practice hereof to provide an outboard guide shoe (not shown) associated with each lifter assembly. The guide shoes define stops to limit the outboard travel of the lifter and to ensure vertical motion. The guide shoes can be deployed in lieu of the camming surface assembly. The guide shoes force the toggling effect in the same manner heretofore described. The vertical motion imparted to the panel by the toggling forces the seal into clamping relationship with the door glass.

It is to be appreciated from the preceding that there has been described herein a powered hatch roof assembly which enables the nesting of one panel beneath the other centrally of the vehicle. It is to be appreciated that many changes and modifications can be made herein without departing from the spirit and scope of the present invention.

Having, thus, described the invention what is claimed is:

1. In a vehicle having a pair of opposed roof openings formed laterally from a central roof support section, a sliding roof assembly therefor, comprising:
 (a) a frane assembly, comprising:
  (1) a pair of opposed upstanding side walls secured to the vehicle,
  (2) first and second channels formed in each side wall, one channel being vertically and laterally displaced from the other channel, a portion of one channel overlying the other channel, the first channel of each side wall defining a first track and the second channel of each side wall cooperating to define a second track,
 (b) first and second viewing panel assemblies, the first assembly being adapted for sliding movement in the first track between an inboard and an outboard position, the second assembly being adapted for sliding movement in the second track between an inboard and an outboard position,
 (c) slidable support means having the viewing panel assemblies connected thereto and disposed in the tracks for supporting the inboard ends of the glass panel assemblies,
 (d) power-operated drive means for each support means and connected thereto for selectively sliding the associated panel assembly between the inboard and positions and position intermediate thereof, and
 (e) means for limiting the outboard movement of each panel disposed in each track.

2. The sliding roof assembly of claim 1 wherein the drive means comprises:
 (a) a reversible motor,
 (b) a bevel gear connected to the output of the motor, and
 (c) a drive cable having one end secured to the associated support means and the other end engageable with the bevel gear, the intermediate portion of the cable engaging the associated roof panel such that the panel assembly moves in response to rotation of the bevel gear.

3. The sliding roof assembly of claim 1 wherein each slidable support means comprises:
 (a) a slide plate disposed in the associated track,
 (b) a link pivotally rotatable connected to the slide plate, the link being pivotally rotatable between a horizontal and a vertical position, and
 (c) a bracket adjustably mounted to the link, the bracket being secured to the associated roof panel.

4. The sliding roof assembly of claim 1 wherein the frame assembly further comprises:
 a support panel interconnecting the side walls and dimensioned to be coincident with a support section of the vehicle.

5. The sliding roof assembly of claim 4 which further comprises:
 (a) an inboard stop disposed in each channel, and
 (b) a camming surface disposed in each channel.

6. The sliding roof assembly of claim 5 which further comprises:
 a first support means slidably mounted in each channel.

7. The sliding roof assembly of claim 6 wherein each support means comprises:
 (a) a slide plate disposed in the associated channel,
 (b) a link pivotally rotatably connected to the slide plate, the link being rotatable through a 90° arc defined by a horizontal position nested in the channel and a vertical position perpendicular to the channel,
 (c) a pin affixed to the slide plate and projecting outwardly therefrom, the pin being engageable with the stop to limit the inboard movement of the support means,
 (d) an adjustable bracket connected to the toggle and having an inboard portion of an associated roof panel assembly connected thereto, and
 wherein the camming surface urges the link to the vertical position upon engagement therebetween.

8. The sliding roof assembly of claim 4 which further comprises:
 (a) a bifurcated track formed integrally with each channel, and
 (b) a pair of opposed track guides secured to each glass roof panel assembly proximate the outboard ends thereof, the track guides being engageable with the associated bifurcated track to support the outboard ends of the panel during the sliding movement thereof.

9. The sliding roof assembly of claim 1 wherein:
 the panel assemblies nest beneath the support section, in overlying relationship, when each is in a fully inboard position.

* * * * *